(12) United States Patent
Zhang et al.

(10) Patent No.: US 7,487,490 B2
(45) Date of Patent: Feb. 3, 2009

(54) SYSTEM FOR SIMPLIFYING LAYOUT PROCESSING

(76) Inventors: Youping Zhang, 33275 Lark Way, Fremont, CA (US) 94555; Weinong Lai, 1620 Walden Ct., Fremont, CA (US) 94539

( * ) Notice: Subject to any disclaimer, the term of this patent is extended or adjusted under 35 U.S.C. 154(b) by 298 days.

(21) Appl. No.: 11/091,067

(22) Filed: Mar. 28, 2005

(65) Prior Publication Data
US 2005/0223350 A1    Oct. 6, 2005

Related U.S. Application Data

(60) Provisional application No. 60/557,809, filed on Mar. 30, 2004.

(51) Int. Cl.
*G06F 17/50* (2006.01)
(52) U.S. Cl. .......................... 716/21; 716/19
(58) Field of Classification Search .................. 716/11, 716/19–21; 430/5, 22, 30
See application file for complete search history.

(56) References Cited

U.S. PATENT DOCUMENTS

| | | | | |
|---|---|---|---|---|
| 6,523,162 | B1 * | 2/2003 | Agrawal et al. | 716/19 |
| 6,625,801 | B1 * | 9/2003 | Pierrat et al. | 716/19 |
| 7,159,197 | B2 * | 1/2007 | Falbo et al. | 716/4 |
| 7,181,721 | B2 * | 2/2007 | Lippincott et al. | 716/21 |

* cited by examiner

*Primary Examiner*—Jack Chiang
*Assistant Examiner*—Binh C Tat
(74) *Attorney, Agent, or Firm*—William C. Milks, III

(57) ABSTRACT

A system and method for integrated circuit design are disclosed to enhance manufacturability of circuit layouts by applying layout processing to handle imperfections such as jogs in integrated circuit design layouts. The layout processing may be applied to jogs in the original integrated circuit design layout or jogs created post-design by process biases, as well as design rule check and Boolean processes or process compensation.

24 Claims, 15 Drawing Sheets

Conventional method usually starts from the same layout that the process is targeting at.
Invention allows the process to start from a different layout than the process targets, using the concept of retarget

SYSTEM FOR SIMPLIFYING LAYOUT PROCESSING

CROSS-REFERENCE TO RELATED PATENT APPLICATION

This application relates to U.S. Provisional Patent Application No. 60/557,809, filed on Mar. 30, 2004, entitled SYSTEM FOR SIMPLIFYING OPTICAL PROXIMITY CORRECTION DISSECTION USING RETARGET.

BACKGROUND OF THE INVENTION

1. Field of the Invention

The present invention relates generally to a system and method for designing integrated circuits or migrating integrated circuit designs from one technology node to another for fabrication by a semiconductor manufacturing process and, more particularly, to a system and method for providing simplified layout processing, for example, optical proximity correction using retarget, for integrated circuit designs to enhance manufacturability and, hence, yield of a semiconductor fabrication process used to produce the integrated circuits.

2. References

U.S. Pat. No. 5,858,580
U.S. Pat. No. 6,430,737 B1
U.S. Pat. No. 6,539,521 B1
U.S. Pat. No. 6,625,801 B1
U.S. Pat. No. 6,792,590 B1

3. Description of the Prior Art

The semiconductor manufacturing industry is continually evolving semiconductor device designs and fabrication processes and developing new processes to produce smaller and smaller geometries of the designs being manufactured, because smaller semiconductor devices typically consume less power, generate less heat, and operate at higher speeds than larger devices. Currently, a single integrated circuit chip may contain over one billion patterns. Consequently, integrated circuit designs and semiconductor fabrication processes are extremely complex, since hundreds of processing steps may be involved. Occurrence of a mistake or small error at any of the design or process steps may necessitate redesign or cause lower yield in the final semiconductor product, where yield may be defined as the number of functional devices produced by the process as compared to the theoretical number of devices that could be produced assuming no bad devices.

Improving time-to-market and yield is a critical problem in the semiconductor manufacturing industry and has a direct economic impact on the semiconductor industry. In particular, a reduced time-to-market and higher yield translate into earlier availability and more devices that may be sold by the manufacturer.

Semiconductor integrated circuit (IC) design and manufacturing processes have become increasingly challenging with each new technology node. With ever decreasing feature sizes, increasing pattern densities, and difficulty experienced in the advancement of IC manufacturing equipment, manufacturing of modern IC designs has encountered substantial impediments and concomitant yield problems within the sub-wavelength regime. Diffraction-limited imaging in the sub-wavelength regime has caused the classical WYSIWYG ("What you see is what you get") paradigm to disappear. With the emergence of sub-wavelength photolithography, the non-linearity of the pattern transfer process onto semiconductor material such as silicon has increased dramatically. Due to this phenomenon, the effectiveness of the conventional IC design methodology has been significantly eroded.

In view of the widening gap between design and manufacturability in the sub-wavelength regime, the use of optical resolution enhancement techniques (RET) such as optical proximity correction (OPC) are prevalent in many of the design and manufacturing schema to produce feature sizes of 0.18 μm and smaller. As the feature size decreases, distortion in the pattern transfer process becomes more severe. The design shapes must be modified in order to print the desired images on the wafer. The modifications account for limitations in the optical lithography process. In the case of OPC, modifications of the design image account for optical limitations as well as mask fabrication limitations and resist limitations. Modifications of the design image can also account for the subsequent process steps like dry etching or implantation. It can also account for flare in the optical system, as well as pattern density variations. Another application of proximity effect correction is the compensation of the effects of aberrations of the optical system used to print the image of the mask onto the wafer. In this case, a mask with aberration correction would be dedicated to a given lithography tool as the aberrations are tool-specific.

FIG. 1 illustrates the modification of the mask data to correct for proximity effects. The processing of the mask data starts with a target layout 1 representing the desired dimensions of the image on the wafer. The printed image 2 of the target layout 1 differs from the desired image due to proximity effect. For reference, the target image 1 is shown with the printed image 2. The edges of the features are then moved (3) so that the corresponding printed image on the wafer 4 is correct (as close to the target as possible). In FIG. 1, all the areas of the layout have been corrected, but different degrees of proximity effect correction aggressiveness can be applied to different regions depending on the criticality of the region in the integrated circuit.

The corrections to layout 1 can be applied using a rule-based approach or a model-based approach. For a rule-based approach (rule-based OPC, or ROPC), the displacement of the segments would be set by a list of rules depending, for example, on the feature size and its environment. For a model-based approach (model-based OPC, or MOPC), the printed image on the wafer would be simulated using a model of the pattern transfer process. The correction would be set such that the simulated image matches the desired wafer image. A combination of rule-based OPC and model-based OPC, sometimes referred to as hybrid OPC, can also be used.

In the case of model-based OPC, the original layout 1 as shown in FIG. 2 is dissected into smaller segments 5 shown in modified layout 6. The stitch points of different segments are the dissection points. Each segment is associated with an evaluation point 7. The printed errors of the evaluation points are compensated by moving the corresponding segment in a direction perpendicular to the segment as shown in the final layout 8. The segments are corrected using multiple iterations in order to account for corrections of neighboring segments.

The image quality can be improved by adding printing or non-printing assist features along the edges of the main features. These assist features modify the diffraction spectrum of the pattern in a way that improves the printing of the main feature. The practical implementation of assist features is enhanced with the use of proximity effect correction as described above to correct for any optical printing artifact as well as resist and etch artifacts.

The image quality of an IC design layout can also be improved by another RET known as phase-shifting masks as described in U.S. Pat. No. 5,858,580, for example. In this case, at least two different regions are created on the masks corresponding to different phase and transmission of the light either going through these regions (for transparent mask) or reflected by these regions (for reflective mask). The phase difference between the two regions is chosen to be substantially equal to 180 degrees. The destructive interference between adjacent regions of opposite phase creates a very sharp contrast at the boundary between the regions, thus leading to the printing of small features on the wafer.

Two main classes of phase-shifting masks are currently in use. For the first class, the amount of light transmitted for transparent masks (or reflected for reflective masks) by one region is only a portion of the light transmitted (or reflected) by the other region, typically 5% to 15%. These masks are referred to as attenuated phase-shifting masks or half-tone phase-shifting masks. In some implementations of attenuated phase-shifting masks, some opaque regions (for transparent masks) or non-reflective regions (for reflective masks) are defined on the mask in order to block the light. This type of mask is referred to as a tri-tone mask. For the second class, the light transmitted (for transparent masks) or reflected (for reflective masks) by one region is substantially equal to the light transmitted (for transparent masks) or reflected (for reflective masks) by the other region. The second class of masks includes the following types of phase-shifting masks: alternating aperture phase-shifting masks, chromeless phase-shifting masks, and rim phase-shifting masks. The practical implementation of these techniques is improved with the use of proximity effect correction as described above to correct for any optical printing artifact as well as resist and etch artifacts. All the techniques can be combined with the use of assist features.

Due to design rule constraints or other design decisions, IC design layouts typically have small jogs or other imperfections. Moreover, jogs can be created after design completion with some design rule check (DRC), Boolean or layer operations, or process compensation (e.g., compensation or correction of etch loading effect). The existence of jogs or other imperfections increases the complexity of the original layout in terms of volume of data (e.g., there are more polygon edges, making edge-based operation more complicated), which subsequently complicates the layout processing. For example, as shown in FIG. 2, the typical OPC technique involves a step referred to as "dissection", or "fragmentation", in which polygon edges are broken into smaller segments, each of which can be moved independently in order to meet the OPC objective. Most dissection schemes typically force dissection at polygon vertices, which can be undesirable from the OPC perspective.

Considered in more detail, FIG. 3 shows two examples. FIG. 3(a) illustrates a case in which jogs are created due to the swelling of poly lines for contact enclosure. The dominant design rules are a contact enclosure margin and the size of the contact itself. In this example, eight vertices 9 and six edges 10 are created as a consequence of the design rule constraint. Four of the new edges (jogs) $10_1$, $10_3$, $10_4$, and $10_6$ are very small in length, which do not represent true design intent (i.e., it is not possible, and there is no need, to correct the printed image to follow the jog).

The other example shown in FIG. 3(b) illustrates the increase in complexity of layouts due to process bias. Process bias refers to a process applied during part of the lithography process, for example, the etch procedure, in which the patterns are further deformed dependent on a number of factors including the width of the pattern, spacing of the pattern with respect to neighboring patterns, or pattern density in the surrounding neighborhood. These effects need to be compensated, usually by the application of biasing to affected edges in a rule- or model-based fashion before the application of RET). Application of process bias based on neighboring spacing creates jogs on the straight poly line due to neighboring feature spacing variation. As show in FIG. 3(b), four new vertices 9 and two jogs 10 are created.

Existence of jogs or other imperfections generally causes increased complexity and deficiency in OPC, because they do not represent the true intent of design. OPC tools can be configured to apply special treatment to exclude these special cases. However, such an approach typically results in complex and error prone OPC set-up.

One problem that the existence of jogs can cause becomes evident in connection with dissection. The existence of jogs, in the form of a pair of consecutive inner and outer corners, forces dissection at the polygon vertices in a manner similar to dissection of regular corners, as shown in FIG. 4. The difference, however, is that regular corners exhibit corner rounding effects in the printed image, as shown in FIG. 4(b), whereas jogs only cause a small tilt in the printed image whose distortion is far less than the rounding effect. As a result, the control at a jog location is tighter than that at the corners. In many cases, the optimum OPC is achieved by dissecting not at the jog vertices, but by dissecting near them, as shown in FIG. 4(c). This is generally not possible with normal OPC which is forced to dissect at vertices.

Currently, most known OPC techniques apply complicated algorithms to cope with jogs as special cases. This not only causes complexity in OPC, but also may not resolve all cases. This may lead to some jogs that are not considered ahead of time and, hence, not handled properly, which often necessitates rework. This also requires a great deal of flexibility in terms of controlling dissection for the OPC tool itself.

In summary, OPC on real IC design layouts is often handicapped by the existence of nuisance jogs or other imperfections which may be due to design rule or post-design processing such as DRC, process bias, or Boolean operations before OPC is applied. The existence of jogs forces dissection at jog locations which are often not optimal, or simply missing dissection and correction when the jog is too small.

Thus, it would be desirable to provide an IC design layout processing system and method for performing layout processing which overcome the above limitations and disadvantages of conventional layout processing systems and techniques, for example, to solve the difficulty in applying OPC dissection caused by jogs, and facilitate generation of IC designs having improved manufacturability. It would also be desirable to provide a layout processing system and method that are simpler and more comprehensive than conventional systems and techniques currently used by OPC users, which are based on mostly complex algorithms and enumeration of special cases and which are generally more complicated and error prone. Further, it would be desirable to provide a layout processing system and method that can be applied even when the original data have jogs, for example, due to design rules, or are introduced by the application of process bias, for example. It is to these ends that the present invention is directed. The various embodiments of the present invention provide many advantages over conventional IC design methods and systems.

SUMMARY OF THE INVENTION

One embodiment of the IC design layout processing system and method in accordance with the present invention provides many advantages over conventional design systems and techniques, which make the IC design layout processing system and method in accordance with various embodiments of the present invention more useful to semiconductor manufacturers. For example, various embodiments of the layout processing system and method in accordance with the present invention solve the OPC dissection problem caused by the existence of small jogs in the input IC design layout. One embodiment of the present invention uses the original pre-bias layout for OPC dissection, while the post-bias layout is still used as the OPC target. Another embodiment of the present invention removes jogs before OPC, while maintaining the original OPC target so that the OPC achieves the intended goals. Accordingly, the various embodiments of the present invention provide a methodology and a system that generate IC designs which have enhanced manufacturability.

The underlying principle of one embodiment of the present invention is to process problematic imperfections such as jogs in the IC design layout. One embodiment of the layout processing system and method in accordance with the present invention addresses IC design layouts in which the original shapes have no jogs. A first processing step (e.g., DRC, process compensation, selective ROPC, etc.) can create jogs, which potentially creates a problem for a second processing step (more than two steps are also possible, where any step before the last step may create jogs, causing a problem for any of the subsequent steps). In accordance with one embodiment of the layout processing system and method of the present invention, the system:

a. In a preparatory step (which can be any step before the last step of a multi-step process), instead of directly modifying the shapes, creates "target" shapes as an annotation to the original shapes, without modifying the original shape; and b. In a subsequent step (which can be the last step or recovery step at any step in the sequence of steps after the preparatory step in a multi-step process) involves a "recovery" (e.g., correction) where the "target" annotation created in the preparatory step is used to retarget the design objective (e.g., OPC target) to recover the intent created by the first step.

The two steps may be implemented at the algorithmic level (e.g., a system that applies both steps, in which the first step does not directly modify the internal data, but adds properties to the original data, and the second step uses these properties to achieve retarget), or at the flow level (e.g., a system consisting of two modules, which communicate by external data, e.g., GDSII, assuming the two modules do not share the same internal data format. The first module does not directly modify input data, but instead creates additional data, e.g., an additional GDSII layer, to mark the "target").

Another embodiment of the layout processing system and method in accordance with the present invention addresses IC design layouts in which the original shapes have jogs or other imperfections. A first step removes jogs, and a second step recovers the original design intent. Similar to the first embodiment in accordance with the present invention, the system can also be implemented both at the algorithmic level (one system that removes jogs, retains original design intent by way of creating "target" shapes, and applies processing based on simplified data, while recovering the original intent by way of retarget), or flow level (one module that removes jogs and outputs the simplified data together with the original design intent as additional "target" data, and a second module that reads the output data and applies processing based on the simplified data, while recovering the original design intent by way of retarget).

The two embodiments may also be combined into a system and method that while applying a first processing step (e.g., DRC, process bias, etc.), creates the new data in the form of additional target data, and at the same time, removes jogs to simplify data and retains the original data in the form of additional target data.

According to one preferred embodiment of the IC design layout processing system and method of the present invention, a layout processing system and method providing OPC dissect and correct layouts with imperfections such as jogs. The data generated by applying the OPC manipulation are then output.

The preferred embodiments of the layout processing system and method in accordance with the present invention solve the difficulty in applying OPC caused by imperfections such as jogs. The application of the layout processing system and method in accordance with the present invention is simpler and more comprehensive than OPC techniques that are currently used by OPC users, which are based on mostly complex algorithms and enumeration of special cases and which are generally more complicated and error prone. The layout processing system and method in accordance with the various embodiments of the present invention can be applied either when the original data have imperfections such as jogs or the imperfections are introduced due to application of design rules, for example. The principles of the present invention also apply to other RET, such as phase-shifting masks, and other layout manipulation techniques.

The foregoing and other objects, features, and advantages of the present invention will become more readily apparent from the following detailed description of various embodiments, which proceeds with reference to the accompanying drawing.

BRIEF DESCRIPTION OF THE DRAWING

The various embodiments of the present invention will be described in conjunction with the accompanying figures of the drawing to facilitate an understanding of the present invention. In the figures, like reference numerals refer to like elements. In the drawing:

FIGS. 3(a) and 3(b), illustrates jogs in an IC design layout caused by either design or post-design modification;

FIGS. 4(a) to 4(c), illustrates a jog and regular corners in an IC design layout;

FIGS. 9(a) to 9(c), is a flow diagram illustrating various embodiments of the method for layout processing including dissection and correction in accordance with the present invention;

FIGS. 14(a) to 14(d), illustrates a transistor ID/Boolean layout;

DETAILED DESCRIPTION OF THE PREFERRED EMBODIMENTS

The present invention is particularly applicable to a computer-implemented software-based IC design layout processing system for generating an IC design based on application of, for example, optical resolution enhancement techniques (RET) such as optical proximity correction (OPC) and phase-shifting masks (PSM) or design rule check (DRC), Boolean or layer operations, or process compensation (e.g., pre-compensation or correction of etch loading effect) to a design layout having or creating imperfections such as jogs, and it is in this context that the various embodiments of the present invention will be described. It will be appreciated, however, that the IC design layout processing system and method in accordance with the various embodiments of the present invention have greater utility, since they may be implemented in hardware or may incorporate other modules or functionality not described herein.

Figure 1:
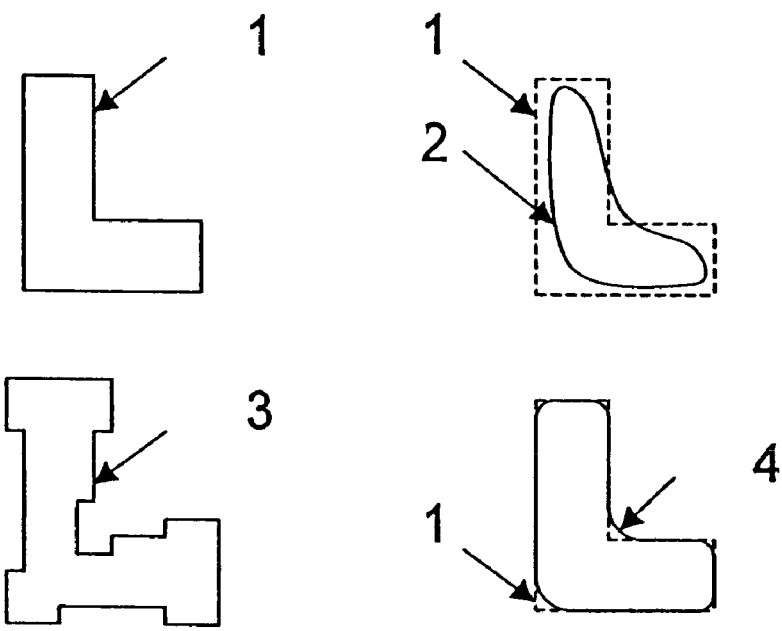
FIG. 1 illustrates modification of IC design layout data to correct proximity effects.
Figure 2:
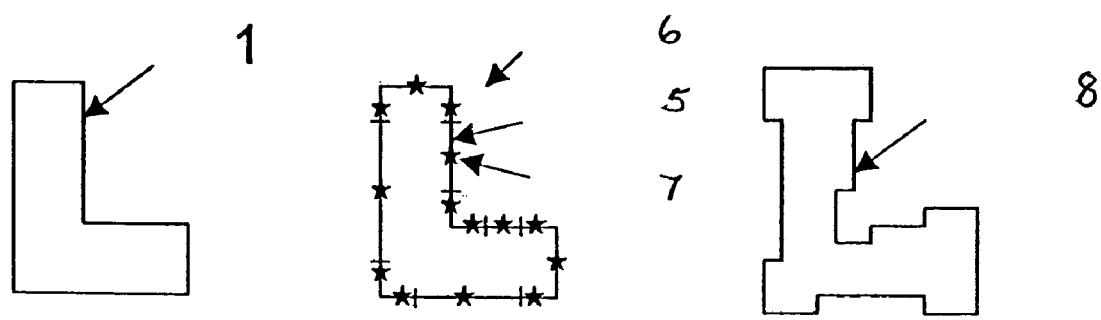
FIG. 2 illustrates the process flow used for model-based optical proximity correction (OPC)
Figure 3:
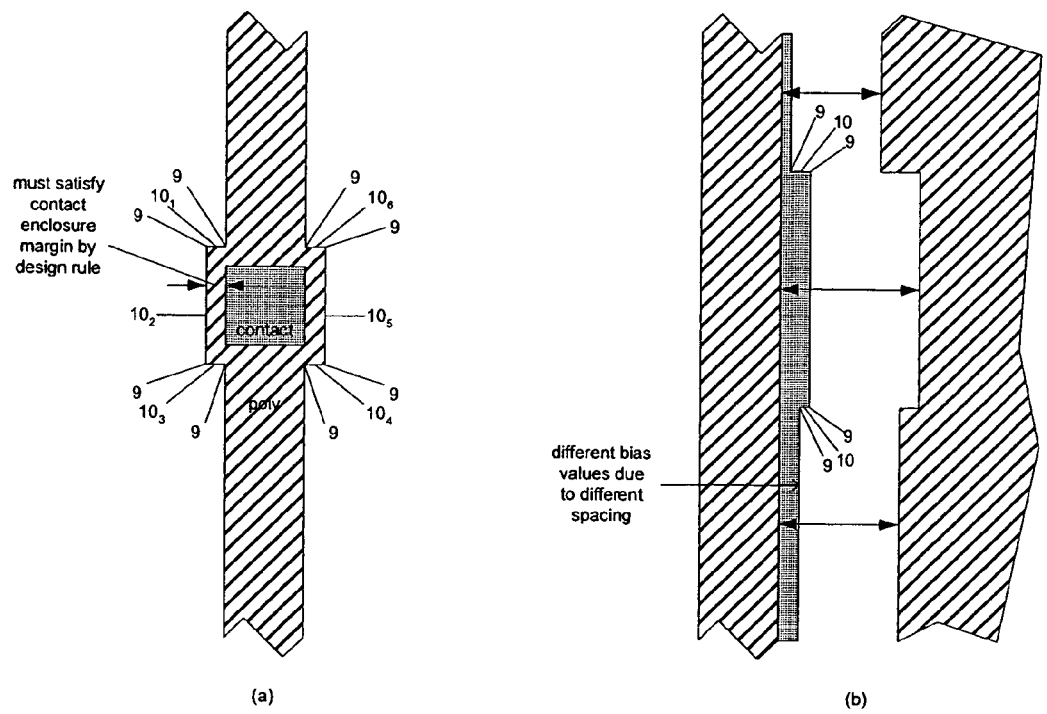
FIG. 3, comprising
Figure 4:
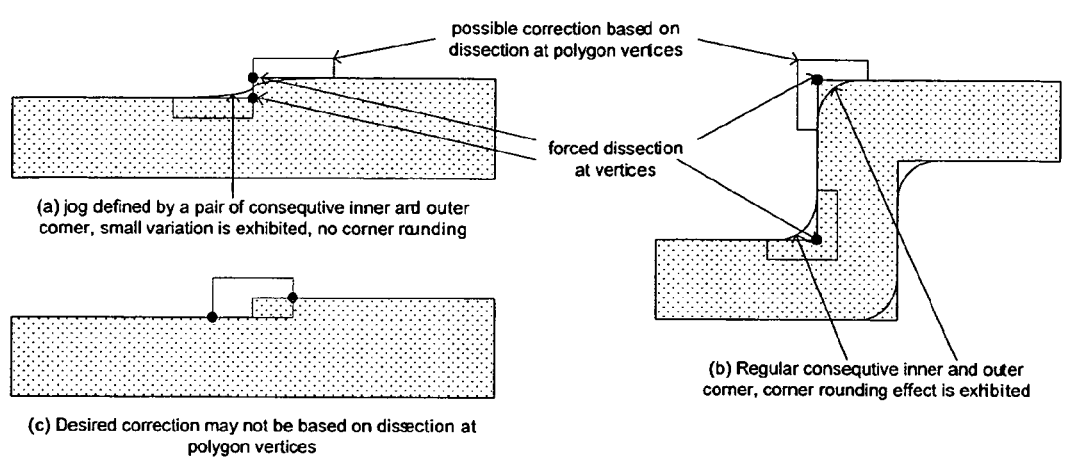
FIG. 4, comprising
Figure 5:
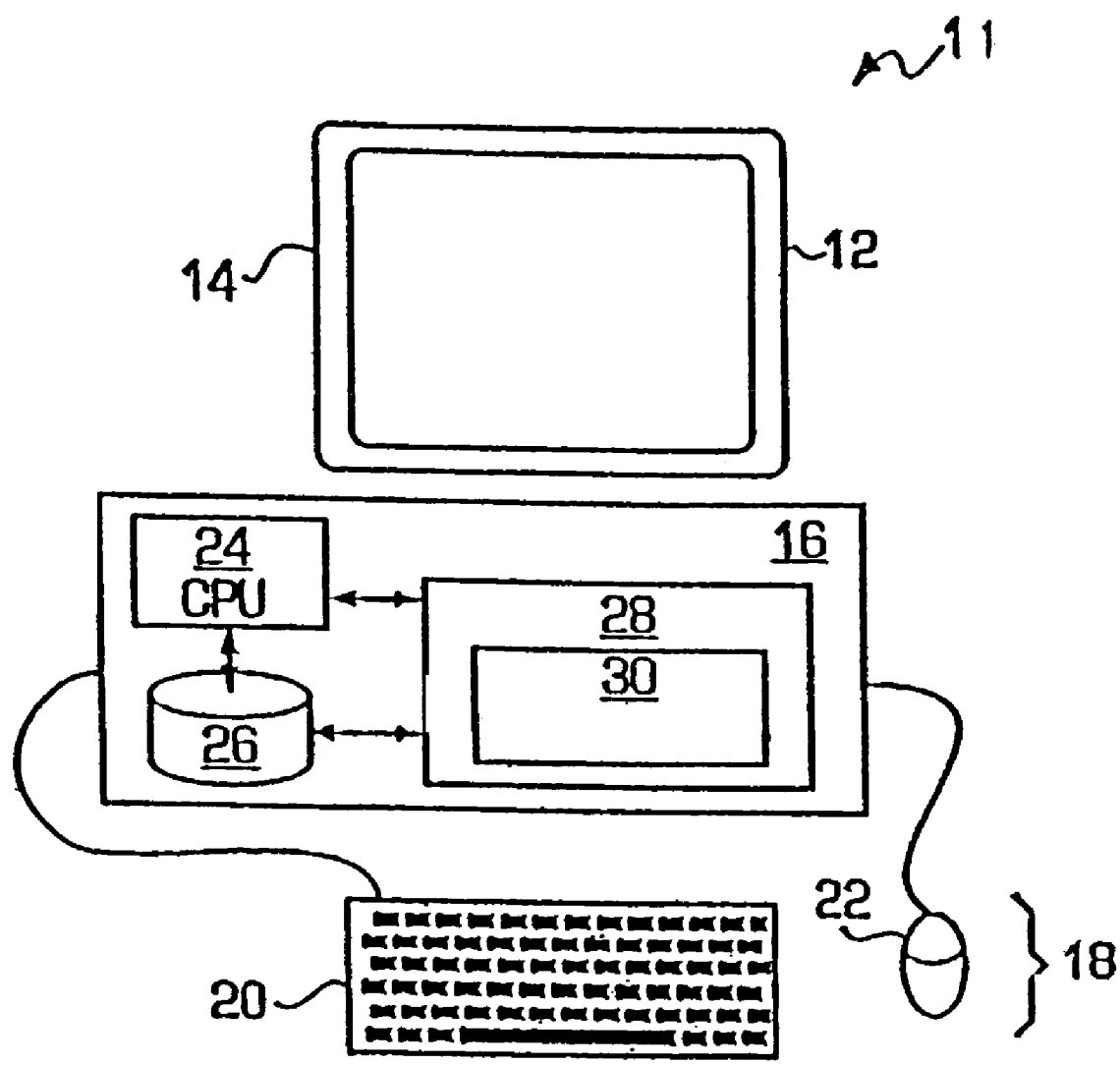
FIG. 5 is a block diagram illustrating an example of an IC design layout processing system in accordance with one embodiment of the present invention.

FIG. 5 is a block diagram illustrating an example of an IC design system 11 for IC design layout processing in accordance with one embodiment of the present invention implemented on a personal computer 12. In particular, the personal computer 12 may include a display unit 14, which may be a cathode ray tube (CRT), a liquid crystal display, or the like; a processing unit 16; and one or more input/output devices 18 that permit a user to interact with the software application being executed by the personal computer. In the illustrated example, the input/output devices 18 may include a keyboard 20 and a mouse 22, but may also include other peripheral devices, such as printers, scanners, and the like. The processing unit 16 may further include a central processing unit (CPU) 24, a persistent storage device 26, such as a hard disk, a tape drive, an optical disk system, a removable disk system, or the like, and a memory 28. The CPU 24 may control the persistent storage device 26 and memory 28. Typically, a software application may be permanently stored in the persistent storage device 26 and then may be loaded into the memory 28 when the software application is to be executed by the CPU 24. In the example shown, the memory 28 may contain an IC design tool 30 for IC design layout processing.

The IC design tool 30 may be implemented as one or more software modules that are executed by the CPU 24.

In accordance with various contemplated embodiments of the present invention, the IC design layout processing system 11 may also be implemented using hardware and may be implemented on different types of computer systems, such as client/server systems, Web servers, mainframe computers, workstations, and the like. Now, more details of an exemplary implementation of the IC design layout processing system 11 in software will be described.

One embodiment of the present invention provides an IC design layout processing system and method for processing an IC design tape-out, e.g., a GDS or OASIS file or a file having another format.

The IC design layout processing system and method in accordance with the various embodiments of the present invention remove or prevent creation of imperfections such as jogs in the IC design layout before applying RET, for example, while compensating for the changes by targeting the reference at the layout with all the jogs. The IC design layout processing system and method in accordance with the various embodiments of the present invention will be better understood by persons skilled in the art in view of the following examples which will be described separately.

One category of IC design layout includes original shapes without imperfections such as jogs. A first processing step (e.g., DRC, process bias, ROPC, etc.) can create jogs, which potentially creates a problem for a second processing step (more than two steps are also possible, where any step before the last step may create jogs, causing a problem for any of the subsequent steps). In accordance with one embodiment of the present invention, the IC design layout processing system 11 provides:

a. In a preparatory step (which can be any step before the last step of a multi-step process), instead of directly modifying the shapes, it creates "target" shapes as an annotation to the original shapes, without modifying the original shape.

b. In a subsequent step (which can be the last step or recovery step at any step in the sequence of steps after the preparatory step in a multi-step process) involves a "recovery" (e.g., correction) where it uses the "target" annotation created in the preparatory step to retarget the design objective (e.g., OPC target) to recover the design intent created by the first step.

The two steps may be implemented at the algorithmic level (e.g., a system that applies both steps, in which the first step does not directly modify the internal data, but adds properties to the original data, and the second step uses these properties to achieve retarget), or at the flow level (e.g., a system consisting of two modules, which communicate by external data, e.g., GDSII, assuming the two modules do not share the same internal data format. The first module does not directly modify input data, but instead creates additional data, e.g., an additional GDSII layer, to mark the "target".

Figure 6:
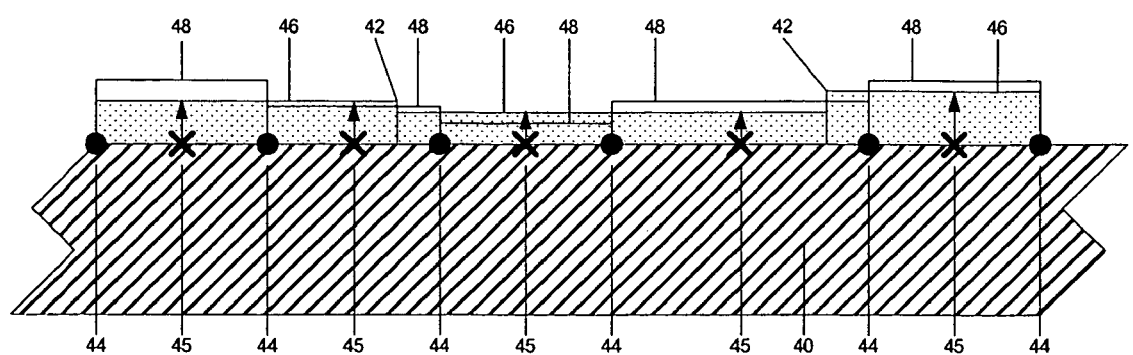
FIG. 6 illustrates OPC dissection applied to an original IC design layout with a biased geometry boundary as a target.

A first example is one in which an original layout 40 has no jogs, but process biases create jogs before applying RET, e.g., OPC, as shown in FIG. 6. FIG. 6 shows would-be results after the biasing illustrated by the dotted regions, which results in multiple jogs 42.

In accordance with one preferred embodiment of the IC design layout processing system and method of the present invention, when performing OPC, dissection is performed as if the original layout geometry 40 shown in FIG. 6 before the biasing is to be corrected. Accordingly, dissection points 44 result as shown in FIG. 6, without regard to the jogs 42 created by the process biases. Then, when performing correction, instead of targeting at the edge on which it dissected, OPC targets at the would-be biased edges 46, as indicated by the numeral 45. Note that the dissection is not constrained at all by the jogs created by the process biases. However, the correction 48 shown in FIG. 6 achieves the objective of making the image contour follow the biased geometry boundary 46.

A second category of IC design layout includes original shapes having jogs. A first artificial step removes jogs, and a second step recovers the original design intent. Similar to the first preferred embodiment described above, the IC design layout processing system 11 in accordance with a second preferred embodiment can also be implemented both at the algorithmic level (one system that removes jogs, retains original design intent by way of creating "target" data, and applies processing based on simplified data, while recovering the original design intent by way of retarget), or the flow level (one module that removes jogs and outputs the simplified data together with the original design intent as additional "target" data, and a second module that reads the output and applies processing based on the simplified data, while recovering the original design intent by way of retarget).

Figure 7:
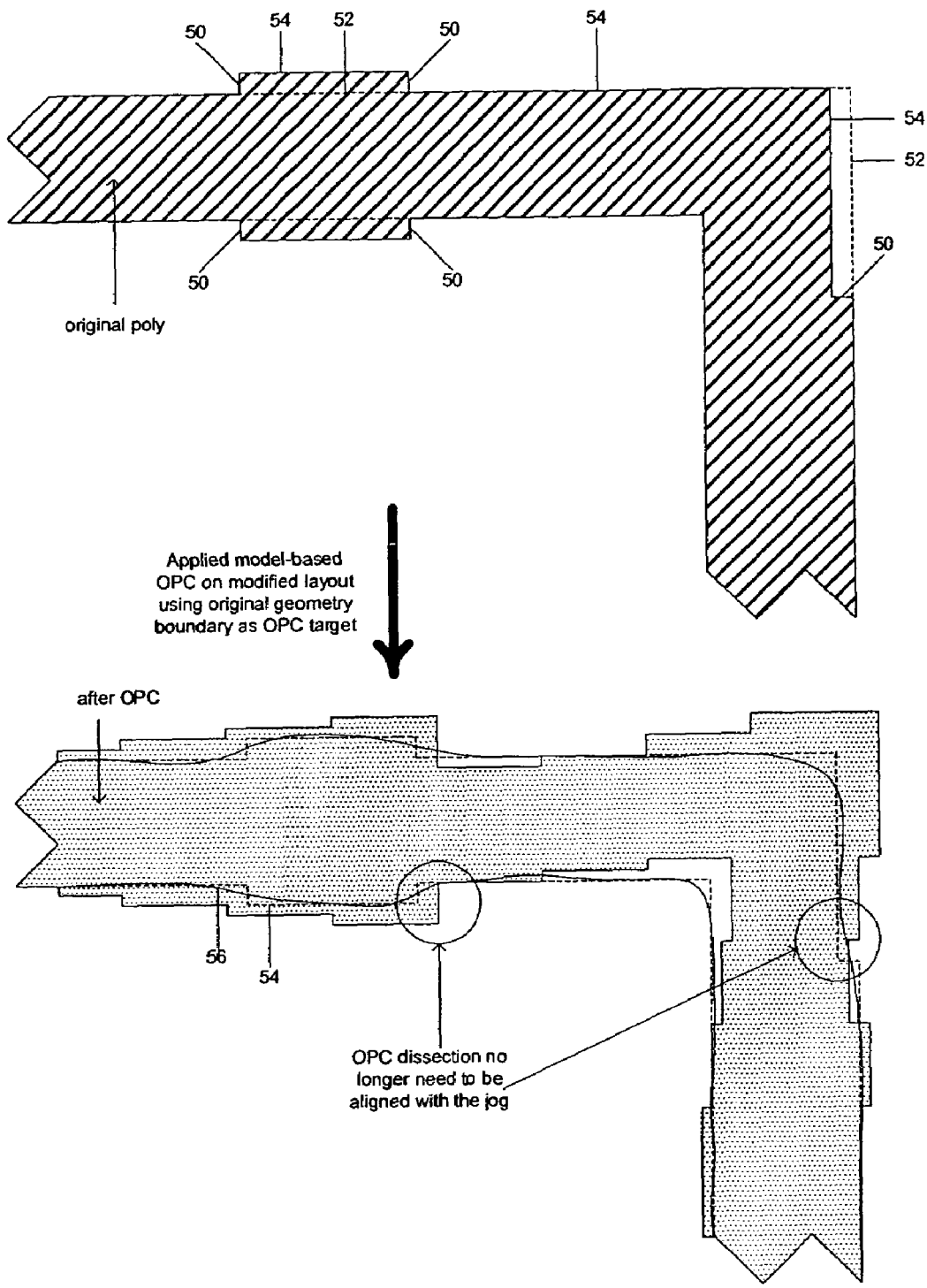
FIG. 7 illustrates dissection applied to an IC design layout using the original layout geometry boundary as a target and an example of OPC output.

A second example in which the original IC design layout has jogs 50 is shown in FIG. 7. In accordance with the second preferred embodiment of the IC design layout processing system and method of the present invention, the layout is first modified by smoothing and notch filling to remove the jogs, as indicated by the dashed lines 52 shown in FIG. 7. Next, the smoothed layout is dissected with dissection points placed along the modified layout geometry boundaries. Then, correction is applied, targeting at the original unmodified layout geometry boundary 54. As a result, there is more flexible dissection that is not constrained by the existence of vertices associated with the jogs. Meanwhile, due to correction retarget, the correction still achieves the objective of making the image contour 56 follow the original layout geometry boundary 54, as demonstrated in FIG. 7.

Figure 8:
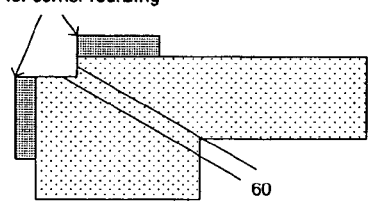
FIG. 8 compares dissection and correction results before and after jogs are removed.
Figure 8:
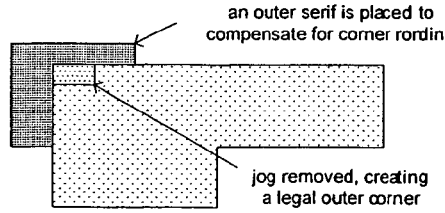

FIG. 8 shows another example in which due to a small jog 60 at an outer corner, the corner fails to be dissected and, hence, corrected. Consequently, the corner rounding effect is not compensated. However, by patching the corner, as shown in the right hand portion of FIG. 8, the corner is completed and, hence, properly dissected and corrected. The corner rounding effect can therefore be compensated.

Figure 9:
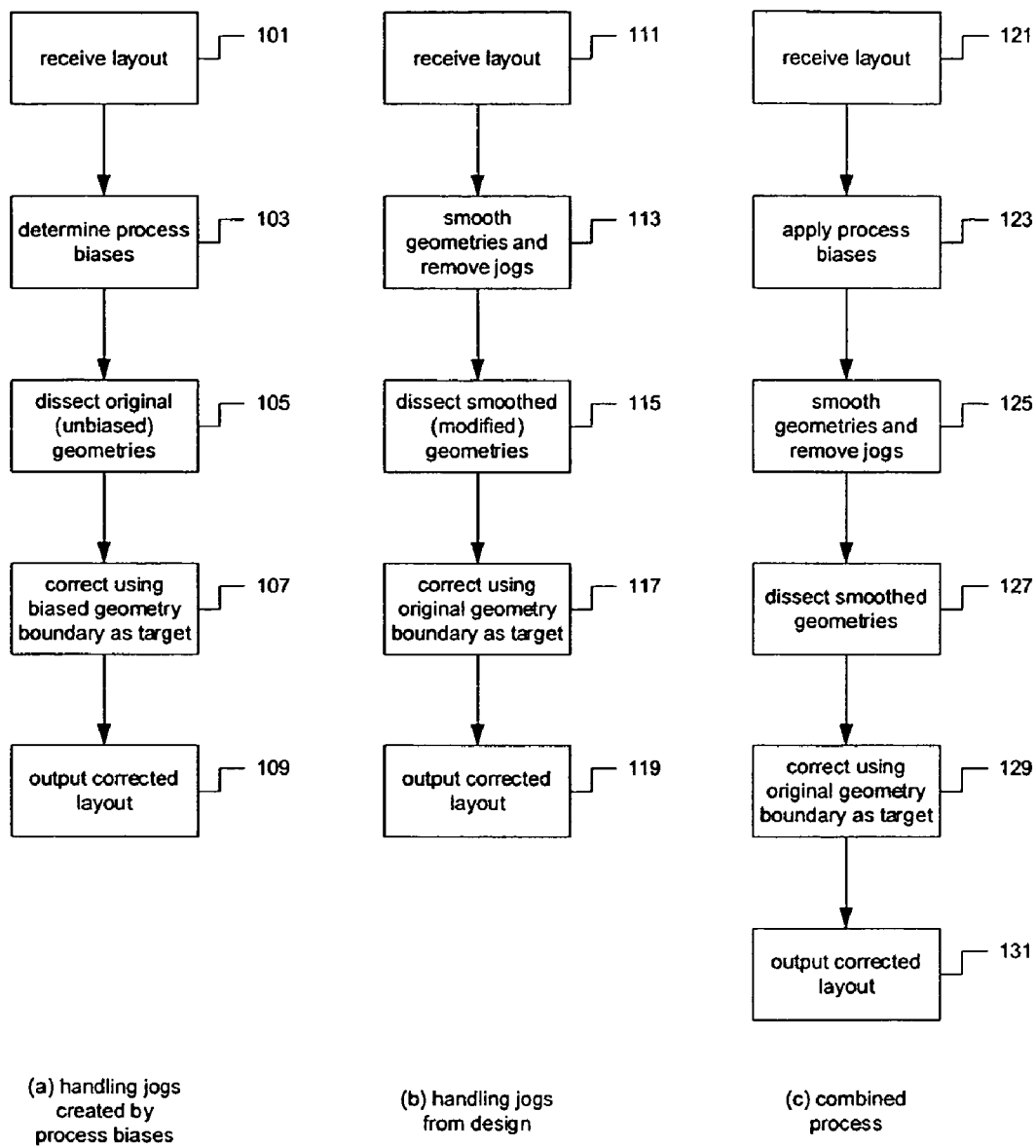
FIG. 9, comprising

Referring again to FIG. 6, FIG. 9(*a*) is a flow diagram illustrating one embodiment of the method in accordance with the present invention for handling jogs created by process biases. As shown in FIG. 9(*a*), the IC design layout is received, as indicated by a step 101. For example, the data may be in the form of GDSII. Next, the process biases are determined, as indicated by a step 103 shown in FIG. 9(*a*). Then, the original, unbiased geometries are dissected, as indicated by a step 105 shown in FIG. 9(*a*). Correction using OPC, for example, is then applied using the biased geometry boundary as a target, as indicated by a step 107 shown in FIG. 9(*a*). Finally, the manipulated IC design layout is output, as indicated by a step 109 shown in FIG. 9(*a*).

Referring again to FIGS. 7 and 8, FIG. 9(*b*) is a flow diagram illustrating another embodiment of the method in accordance with the present invention for handling jogs or other imperfections in original IC design layouts. As shown in FIG. 9(*b*), the IC design layout is received, as indicated by a step 111. For example, the data may be in the form of GDSII. Next, the IC design layout geometries are smoothed, and the identified jogs, for example, are removed, as indicated by a step 113 shown in FIG. 9(*b*). Then, the smoothed, modified geometries are dissected, as indicated by a step 115 shown in FIG. 9(*b*). Correction using OPC, for example, is then applied using the original layout geometry boundary as a target, as indicated by a step 117 shown in FIG. 9(*b*). Finally, the manipulated IC design layout is output, as indicated by a step 119 shown in FIG. 9(*b*).

The two preferred embodiments may also be combined into a system that while applying a first processing step (e.g., process bias), creates new data in the form of additional target data, and at the same time, removes jogs to simplify data and retain the original data in the form of additional target data.

Figure 10:
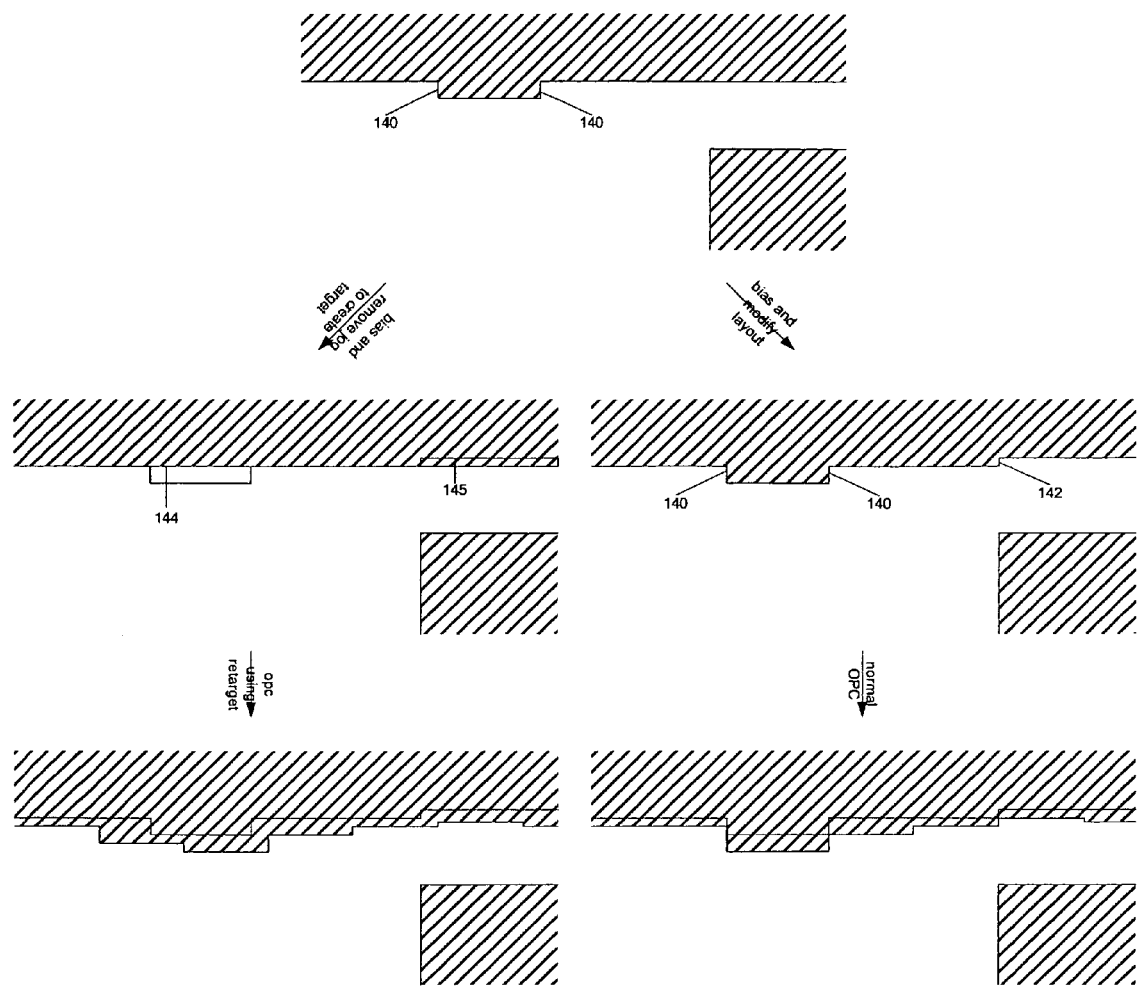
FIG. 10 illustrates an example of conventional OPC in comparison with layout processing in accordance with one embodiment of the present invention with OPC applied to a design layout in which jogs exist in the original layout, as well as jogs introduced by process biases.

For example, FIG. 10 illustrates conventional OPC in comparison with layout processing in accordance with one embodiment of the present invention with OPC applied to a design layout in which jogs exist in the original layout, as well as jogs introduced by process biases. FIG. 10 provides comparison of conventional OPC on the right and in accordance with one embodiment of the IC design layout processing system 11 on the left.

In accordance with conventional OPC, the original shape has two jogs 140, and after application of process bias, the proximity of a neighboring feature introduces another jog 142 on the edge that is considered for correction using OPC. As a consequence, dissection points are anchored at these jog locations. The conventional OPC results preserve the jog locations and may not be optimal because of the restriction of selection of dissection points.

In accordance with a preferred embodiment of the IC design layout processing system and method of the present invention, these jogs are first smoothed, as indicated by the lines 144 shown in FIG. 10. Moreover, the process bias is applied in a form of a target 145, without creating a new jog, leading to an edge that can be dissected freely. Then, OPC is applied retargeting the shape with the process bias but before the jogs 140 were removed. The OPC results are different, and the locations of dissection points are no longer constrained by the existence of jogs 140 in the original layout and a new jog 142 that would be introduced by the process bias. This dissection scheme may be superior to the conventional dissection scheme and can result in better OPC results.

Accordingly, referring to FIG. 10, FIG. 9(*c*) is a flow diagram illustrating another embodiment of the method in accordance with the present invention. As shown in FIG. 9(*c*), the IC design layout is received, as indicated by a step 121. For example, the data may be in the form of GDSII. Next, process biases are applied to the received IC design layout, as indicated by a step 123 shown in FIG. 9(*c*). The biased IC design layout geometries are then smoothed, and the identified jogs are removed, as indicated by a step 125 shown in FIG. 9(*c*). The smoothed, modified layout geometries are next dissected, as indicated by a step 127 shown in FIG. 9(*c*). Correction using OPC, for example, is then applied using the biased layout geometry boundary as a target, as indicated by a step 129 shown in FIG. 9(*c*). Finally, the manipulated IC design layout is output, as indicated by a step 131 shown in FIG. 9(*c*).

Figure 11:
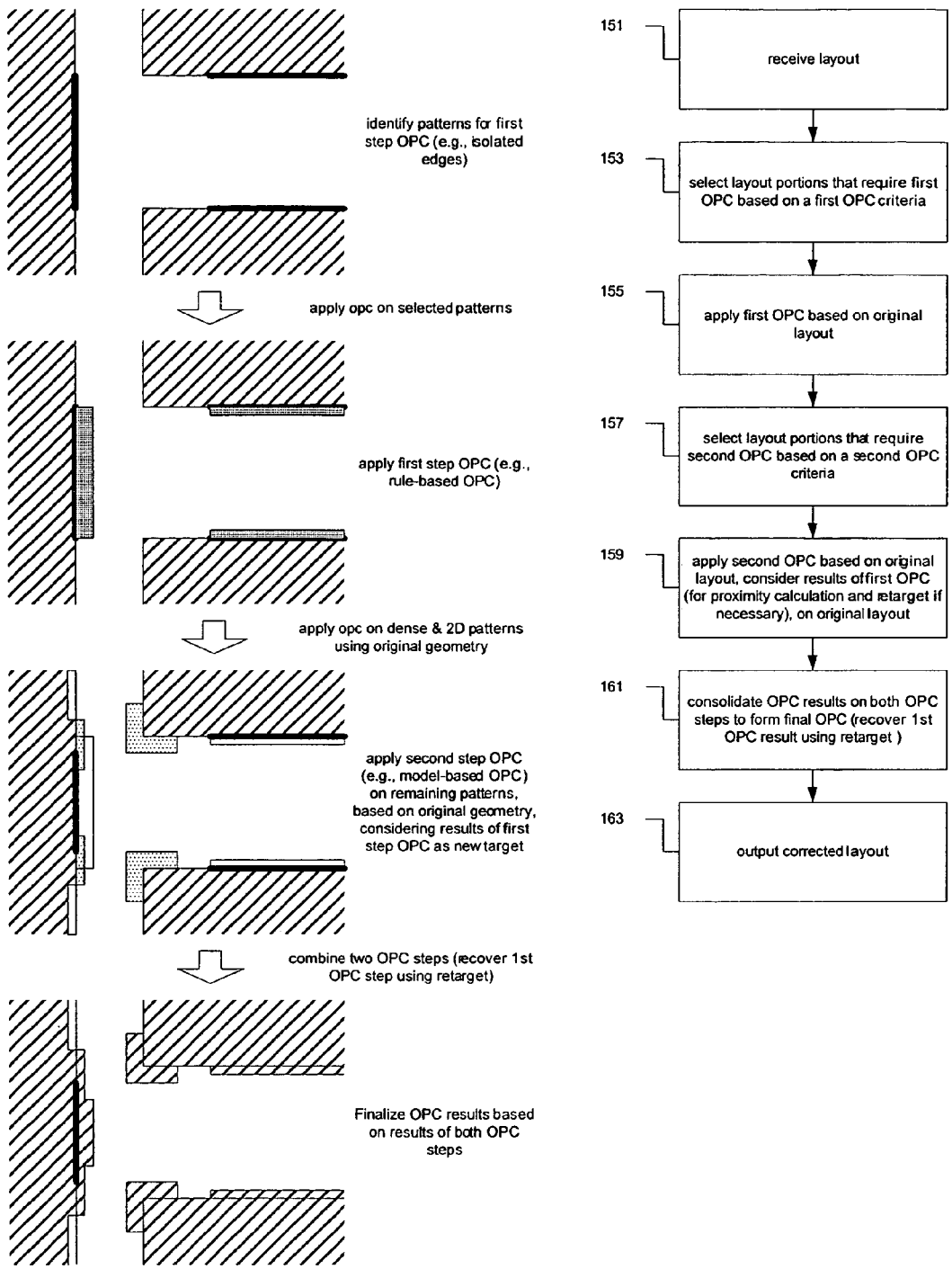
FIG. 11 is a flow diagram illustrating another embodiment of the method for layout processing including OPC dissection and correction in accordance with the present invention consisting of two steps, one that is rule-based, followed by another that is model-based.

FIG. 11 shows a method in accordance with yet another embodiment of the present invention similar to the method shown in FIG. 9(*a*) described earlier. In contrast to the method shown in FIG. 9(*a*), the method shown in FIG. 11 involves OPC consisting of two steps, one that is rule-based (ROPC), followed by another that is model-based (MOPC).

As shown in FIG. 11, the IC design layout is received, as indicated by a step 151. For example, the data may be in the form of GDSII. Next, portions of the IC design layout that require OPC based on first OPC criteria, for example, ROPC, are selected, as indicated by a step 153 shown in FIG. 11. Then, the first OPC procedure is applied to the original layout data, as indicated by a step 155 shown in FIG. 11. Next, portions of the IC design layout that require OPC based on second OPC criteria, for example, MOPC, are selected, as indicated by a step 157 shown in FIG. 11. Then, the second OPC procedure is applied to the original layout data while considering the results of the first OPC procedure (for proximity calculation and retarget if required), as indicated by a step 159 shown in FIG. 11. Next, the OPC results based on the first (e.g., ROPC) and second (e.g., MOPC) are combined, recovering the first result using retarget, as indicated by a step 161 shown in FIG. 11. Finally, the manipulated IC design layout is output, as indicated by a step 163 shown in FIG. 11.

Figure 12:
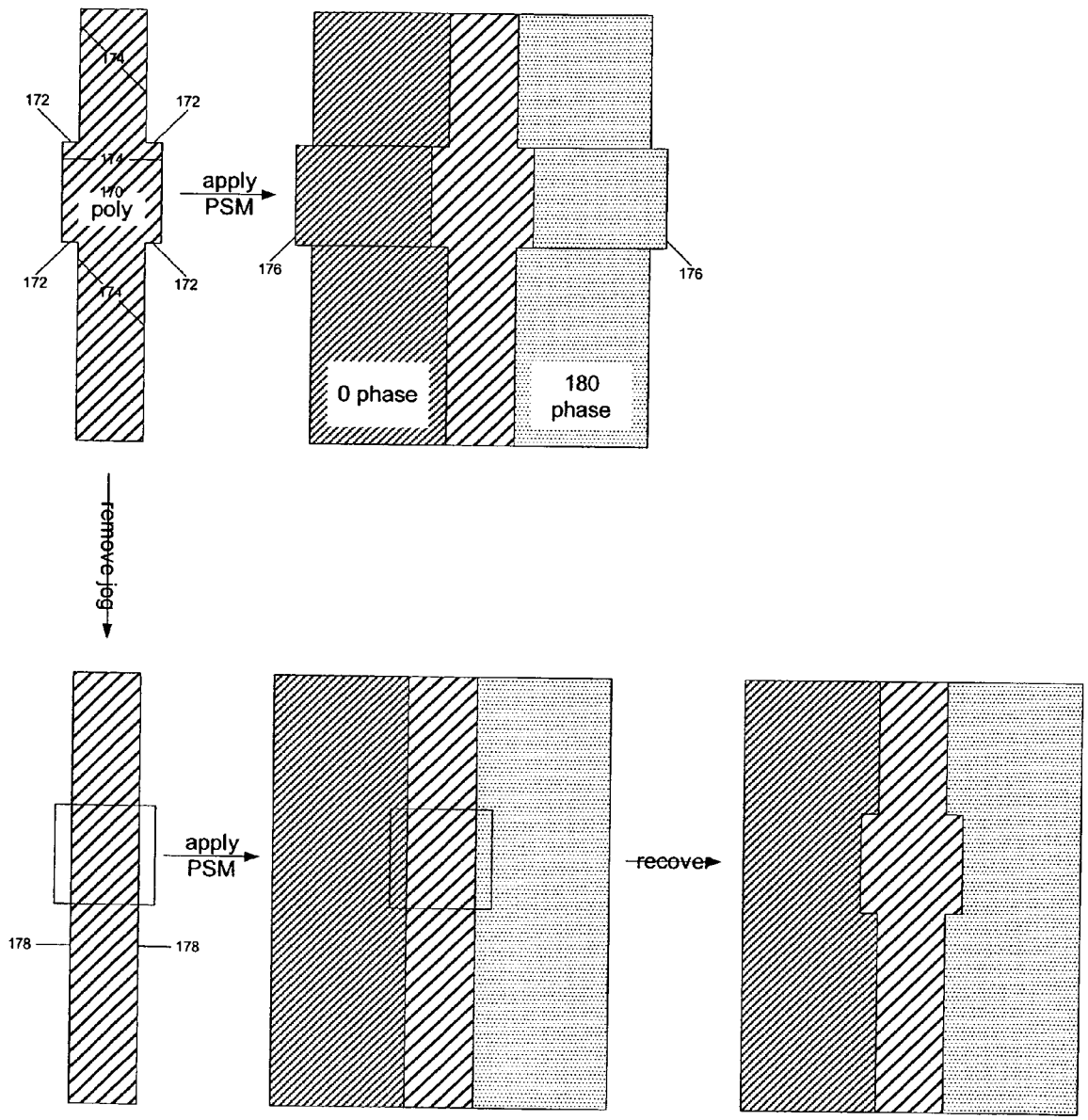
FIG. 12 illustrates an example of an IC design layout having jogs to which the method for layout processing including phase-shifting masks is applied in accordance with the present invention.

The principles of the present invention apply to other RET, e.g., phase-shifting masks, as well as other layout manipulation techniques. For example, as shown in FIG. 12, a poly line 170 that is to be phase-shifted includes a swelling portion which introduces four jogs 172. The short edges on the jogs 172 should not be phase-shifted, because they do not represent true design intent, whereas the remaining three pairs of edges 174 should be phase-shifted. As a consequence, according to the conventional approach, this case needs to be treated in a special manner to avoid phase-shifting the two opposing pairs of jogs 172, while phase-shifting the three opposing pairs of edges 174 that represent actual design intent. Also, as a consequence of preserving desired shifter width, the two phase shifters (0 phase and 180 phase) also contain swellings 176. Note that phase-shifting of this pattern is inevitably more complex than phase-shifting a straight line without the jogs 172. In accordance with the above-described embodiments of the present invention, the jogs are first smoothed to create straight lines 178, which can be phase-shifted easily, then an extra step is applied to recover the design intent by taking out part of the phase shifters corresponding to the swelling portion of the poly 170. As a result, the shifter shapes are slightly different due to the absence of the swelling 176. Note that the phase shifter placement is simpler now because of the simplification of the target geometries.

Figure 13:
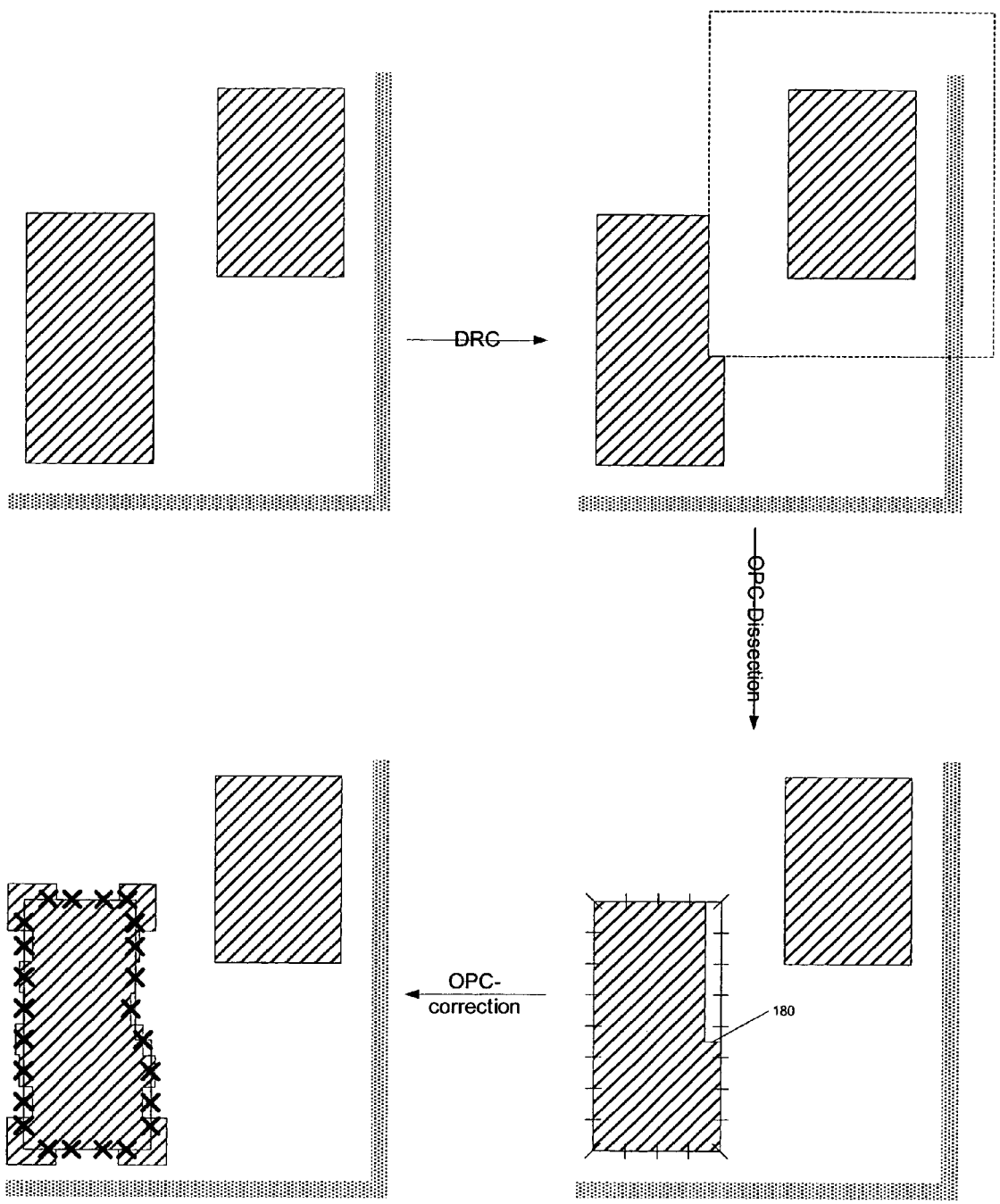
FIG. 13 illustrates an example of a jog created after design completion by design rule check (DRC) in which the original design layout is dissected and correction is then retargeted to the layout created by DRC.

FIG. 13 illustrates an example of a jog 180 created after design completion by design rule check (DRC). The layout processing system and method in accordance with the present invention process the biased layout, by removing the jog 180, such that the original design layout is dissected, and then correction is retargeted to the layout created by DRC, as shown in FIG. 13.

Figure 14:
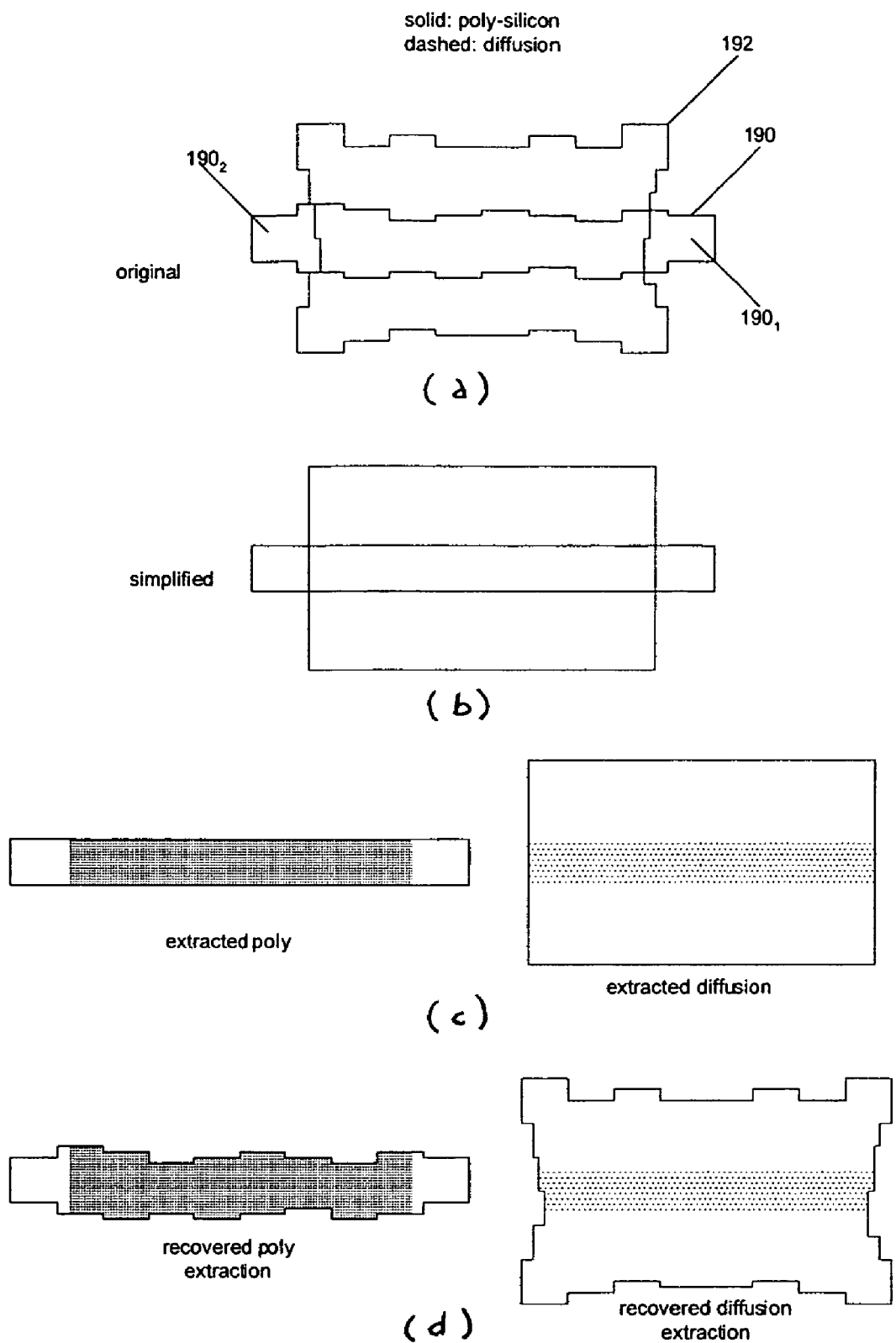
FIG. 14, comprising

FIG. 14 illustrates a transistor ID/Boolean example. As shown in FIG. 14(*a*), the original poly 190 and diffusion 192 have complex shapes (due to process bias or OPC, for example). The goal is to extract the portion of the poly 190 and diffusion 192 that corresponds to a transistor. Suppose that the transistor is defined as poly over diffusion where poly exits diffusion at exactly two locations, for example, as indicated by 190$_1$ and 190$_2$ shown in FIG. 14. The complex shapes of poly 190 and diffusion 192 can lead to complication in the transistor ID algorithm, which involves Boolean or layer operations which may be complex. In accordance with the layout processing system and method of the present invention, the poly and diffusion shapes are simplified, as shown in FIG. 14(*b*), then transistor ID can be easily performed as both the poly and diffusion shapes are simple rectangles. Next, the poly and diffusion portions corresponding to the transistor are extracted, which are also simple rectangles as shown in FIG. 14(*c*). Then, in a final step shown in FIG. 14(*d*), these rectangles are mapped back to the original poly and diffusion shapes, and the actual poly and diffusion portions corresponding to the transistor as defined by the original poly 190 and diffusion 192 are recovered.

Figure 15:
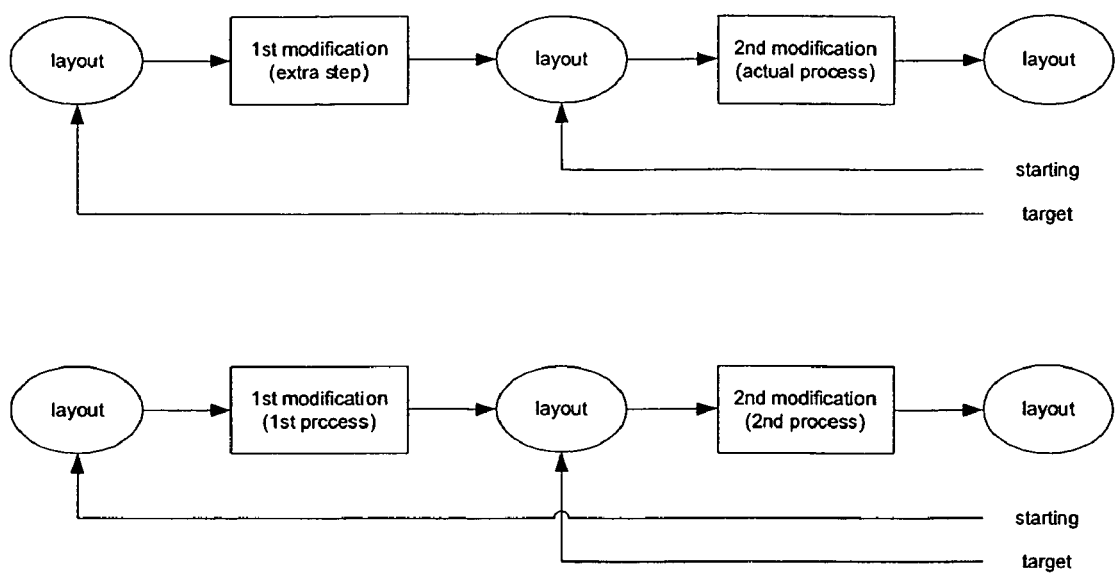
FIG. 15 is a system diagram illustrating two or more step processes in which the earlier steps prefer simpler geometrical shapes such as ones with no jogs or fewer vertices, as long the later steps can recover these changes, in accordance with the various embodiments of the present invention.
Figure 16:
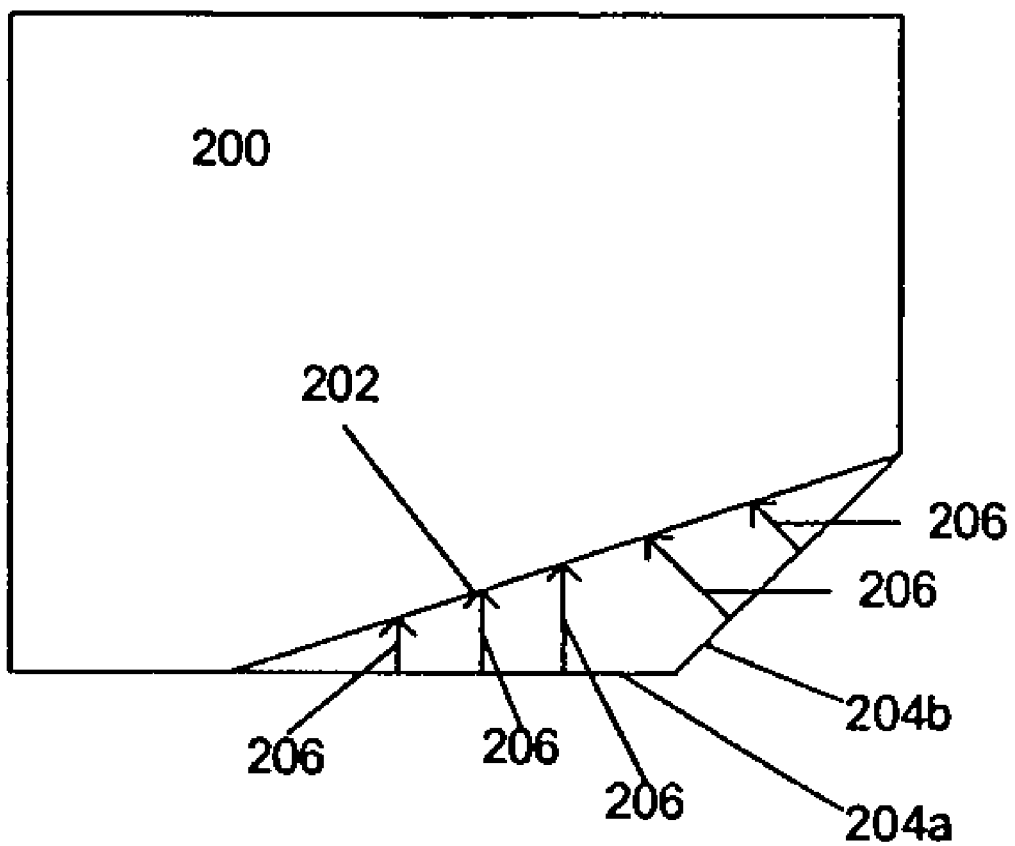
FIG. 16 shows an angled feature comprising a design layout.

While the foregoing description has been with reference to particular embodiments of the present invention, it will be appreciated by those skilled in the art that changes in these embodiments may be made without departing from the principles and spirit of the invention. Generally speaking, the method in accordance with the various embodiments of the present invention applies to any two or more step processes in which the earlier steps prefer simpler geometrical shapes such as ones with no jogs or fewer vertices, as long the later steps can recover these changes, as shown in FIG. 15. OPC is an example in which the first step is a dissection, which prefers geometries with no jogs, for example, and the second step recovers the changes by means of retargeting. Note that the OPC may be model-based or rule-based. Also, only process biases are considered in conjunction with the described OPC examples. While the jogs may be created post-design by process biases as described, it is also contemplated that the jogs may be created by other processes such as DRC or Boolean processes as described in conjunction with FIG. 13. The system and method in accordance with the various embodiments of the present invention also apply to dissecting and correcting layouts with jogs created by these and other types of processes. Also, the principles underlying the system and method in accordance with the present invention apply to processing other geometrical patterns of IC design layouts besides jogs that are difficult to handle using known layout processing. One such difficulty is geometries that are of unusual angles, such as 30 degrees. Most software is designed to handle geometries with edges that are angled approximately at a multiple of 45 degrees. As shown in FIG. 16, geometry 200 contains an edge 202 with an angle that is substantially different from a multiple of 45 degrees. In order to process this geometry, the edge 202 is first regulated to contain a horizontal edge 204*a* and a 45 degree edge 204*b*. In the retargeting step, the processing targets back toward the original edge 202, as shown in 206. Accordingly, the scope of the present invention can only be ascertained with reference to the appended claims.

What is claimed is:

1. An integrated circuit design system having computer software for correcting integrated circuit design layouts and having correction for problematic shapes introduced by application of a previously applied layout process, the computer software comprising:
    code for receiving input layout data representing an integrated circuit design layout;
    code for determining whether a problematic shape has been created in the layout by application of a previously applied layout process selected from among the group of processes consisting of design rule check and Boolean processes or process compensation;
    code for applying a correction process to original unprocessed geometries, using the process geometries as a target; and
    code for outputting the corrected manipulated integrated circuit design layout; wherein the correction process involves a dissection step and a correction step, the dissection is performed on the original unprocessed geometries, and correction targets at the processed layout geometry boundary.

2. The system of claim 1 wherein the input layout data is a design tape-out in the form of a GDS or OASIS file.

3. An integrated circuit design system having computer software to provide optical proximity correction for handling jogs created by process biases, the computer software comprising:
    code for receiving input layout data representing an integrated circuit design layout;

code for determining process biases applied by a process selected from among the group of processes consisting of design rule check and Boolean processes or process compensation;

code for dissecting original, unbiased geometries of the layout;

code for applying optical proximity correction to the layout using the biased layout geometry boundary as a target; and code for outputting the optical-proximity-corrected manipulated integrated circuit design layout.

4. The system of claim 3 wherein the input layout data is a design tape-out in the form of a GDS or OASIS file.

5. An integrated circuit design system having computer software for correcting integrated circuit design layouts and having correction for one or more problematic shapes in an original integrated circuit design layout, the computer software comprising:

code for receiving input layout data representing the original integrated circuit design layout;

code for smoothing the original integrated circuit design layout geometries and removing the one or more problematic shapes in the layout;

code for dissecting the smoothed, modified geometries of the layout;

code for applying correction to the layout using the original layout geometry boundary as a target; and code for outputting the corrected manipulated integrated circuit design layout.

6. The system of claim 5 wherein the input layout data is a design tape-out in the form of a GDS or OASIS file.

7. An integrated circuit design system having computer software to provide optical proximity correction for handling jogs in original integrated circuit design layouts, the computer software comprising:

code for receiving input layout data representing an original integrated circuit design layout;

code for smoothing the original integrated circuit design layout geometries and removing the identified jogs in the layout;

code for dissecting the smoothed, modified geometries of the layout;

code for applying optical proximity correction to the layout using the original layout geometry boundary as a target; and code for outputting the optical-proximity-corrected manipulated integrated circuit design layout.

8. The system of claim 7 wherein the input layout data is a design tape-out in the form of a GDS or OASIS file.

9. An integrated circuit design system for correcting integrated circuit design layouts and having computer software to provide correction for problematic shapes in the original layout and/or introduced by application of a layout process, the computer software comprising:

code for receiving input layout data representing an integrated circuit design layout;

code for applying a layout process selected from among the group of processes consisting of design rule check and Boolean processes or process compensation to the received integrated circuit design layout;

code for smoothing the integrated circuit design layout geometries and removing the one or more problematic shapes in the original layout or created by applying the layout process;

code for dissecting the smoothed, modified geometries of the layout;

code for applying correction to the layout using the processed layout geometry boundary as a target; and means for outputting the corrected manipulated integrated circuit design layout.

10. The system of claim 9 wherein the input layout data is a design tape-out in the form of a GDS or OASIS file.

11. An integrated circuit design system having computer software for applying process biases and for providing optical proximity correction for handling resulting jogs in the biased geometries in integrated circuit design layouts, the computer software comprising:

code for receiving input layout data representing an integrated circuit design layout;

code for applying process biases to the received integrated circuit design layout;

code for smoothing the biased integrated circuit design layout geometries and removing the identified jogs;

code for dissecting the smoothed, modified geometries of the layout;

code for applying optical proximity correction using the biased determined by a process selected from among the group of processes consisting of design rule check and Boolean processes or process compensation layout geometry boundary as a target; and code for outputting the optical-proximity-corrected manipulated integrated circuit design layout.

12. The system of claim 11 wherein the input layout data is a design tape-out in the form of a GDS or OASIS file.

13. A method for integrated circuit design for correcting integrated circuit design layouts and having correction for problematic shapes introduced by application of a previously applied layout process, comprising:

receiving input layout data representing an integrated circuit design layout;

determining whether has created a problematic shape has been created in the layout by application of a previously applied layout process selected from among the group of processes consisting of design rule check and Boolean processes or process compensation;

dissecting original, unprocessed geometries of the layout if the previously applied layout process has created a problematic shape in the layout;

applying correction to the layout using the previously processed layout geometry boundary as a target; and outputting the corrected manipulated integrated circuit design layout.

14. The method of claim 13 wherein the input layout data is a design tape-out in the form of a GDS or OASIS file.

15. A method for providing optical proximity correction for handling jogs created in integrated circuit designs created by process biases, comprising:

receiving input layout data representing an integrated circuit design layout;

determining process biases applied by a process selected from among the group of processes consisting of design rule check and Boolean processes or process compensation;

dissecting the original, unbiased layout geometries;

applying optical proximity correction to the layout using the biased layout geometry boundary as a target; and outputting the optical-proximity-corrected manipulated integrated circuit design layout.

16. The method of claim 15 wherein the input layout data is a design tape-out in the form of a GDS or OASIS file.

17. A method for integrated circuit design for correcting integrated circuit design layouts and having correction for one or more problematic shapes in an original integrated circuit design layout, comprising:
- receiving input layout data representing the original integrated circuit design layout;
- smoothing the original integrated circuit design layout geometries and removing the one or more problematic shapes in the layout;
- dissecting the smoothed, modified geometries of the layout;
- applying correction to the layout using the original layout geometry boundary as a target; and
- outputting the corrected manipulated integrated circuit design layout.

18. The method of claim 17 wherein the input layout data is a design tape-out in the form of a GDS or OASIS file.

19. A method for providing optical proximity correction for handling jogs in original integrated circuit design layouts, comprising:
- receiving input layout data representing an original integrated circuit design layout;
- smoothing the original integrated circuit design layout geometries and removing the identified jogs in the layout;
- dissecting the smoothed, modified geometries of the layout;
- applying optical proximity correction to the layout using the original layout geometry boundary as a target; and
- outputting the optical-proximity-corrected manipulated integrated circuit design layout.

20. The method of claim 19 wherein the input layout data is a design tape-out in the form of a GDS or OASIS file.

21. A method for integrated circuit design for correcting integrated circuit design layouts and having correction for problematic shapes in the original layout and/or introduced by application of a layout process, comprising:
- receiving input layout data representing an integrated circuit design layout;
- applying the layout process to the received integrated circuit design layout;
- smoothing the integrated circuit design layout geometries and removing the one or more problematic shapes in the original layout or created by applying the layout process selected from among the group of processes consisting of design rule check and Boolean processes or process compensation;
- dissecting the smoothed, modified geometries of a layout;
- applying correction to the layout using the processed layout geometry boundary as a target; and
- outputting the corrected manipulated integrated circuit design layout.

22. The method of claim 21 wherein the input layout data is a design tape-out in the form of a GDS or OASIS file.

23. A method for applying process biases determined by a process selected from among the group of processes consisting of design rule check and Boolean processes or process compensation and optical proximity correction for handling resulting jogs in the biased geometries in integrated circuit design layouts, comprising:
- receiving input layout data representing an integrated circuit design layout;
- applying process biases to the received integrated circuit design layout;
- smoothing the biased integrated circuit design layout geometries and removing the identified jogs;
- dissecting the smoothed, modified geometries of the layout;
- applying optical proximity correction using the biased layout geometry boundary as a target; and
- outputting the optical-proximity-corrected manipulated integrated circuit design layout.

24. The method of claim 23 wherein the input layout data is a design tape-out in the form of a GDS or OASIS file.

* * * * *